United States Patent
Scaramucci

(10) Patent No.: US 7,032,880 B2
(45) Date of Patent: Apr. 25, 2006

(54) VALVE WITH PRESSURE ADAPTABLE SEAT

(75) Inventor: John P. Scaramucci, Oklahoma City, OK (US)

(73) Assignee: Valve Innnovations, L.L.C., Carson City, NV (US)

( * ) Notice: Subject to any disclaimer, the term of this patent is extended or adjusted under 35 U.S.C. 154(b) by 0 days.

(21) Appl. No.: 10/806,000

(22) Filed: Mar. 22, 2004

(65) Prior Publication Data

US 2005/0205826 A1    Sep. 22, 2005

(51) Int. Cl.
    F16K 25/00    (2006.01)
(52) U.S. Cl. .................. 251/172; 251/174; 251/359
(58) Field of Classification Search ............... 251/172, 251/174, 180, 314, 315.01, 359
    See application file for complete search history.

(56) References Cited

U.S. PATENT DOCUMENTS

| | | |
|---|---|---|
| 3,347,517 A | 10/1967 | Scaramucci |
| 3,371,907 A | 3/1968 | Scaramucci |
| 3,380,706 A | 4/1968 | Scaramucci |
| 3,380,707 A | 4/1968 | Scaramucci |
| 3,405,908 A | 10/1968 | Scaramucci |
| 3,486,736 A | 12/1969 | Scaramucci |
| 3,504,885 A * | 4/1970 | Hulsey ................ 251/172 |
| 3,617,027 A | 11/1971 | Scaramucci |
| 3,746,303 A | 7/1973 | Grove et al. |
| 3,765,647 A | 10/1973 | Grove et al. |
| 3,872,889 A | 3/1975 | Smith et al. |
| 4,163,544 A | 8/1979 | Fowler et al. |
| 4,254,793 A | 3/1981 | Scaramucci |
| 4,262,688 A | 4/1981 | Bialkowski |
| 4,304,252 A | 12/1981 | Stanton |
| 4,318,420 A | 3/1982 | Calvert |
| 4,385,747 A | 5/1983 | Renaud, Jr. et al. |
| 4,509,546 A * | 4/1985 | Brookes ................ 137/74 |
| 4,552,335 A | 11/1985 | Alexander et al. |
| 4,568,061 A | 2/1986 | Rabe |
| 4,718,444 A | 1/1988 | Boelte |
| 4,749,002 A | 6/1988 | Lembser |
| 4,815,700 A | 3/1989 | Mohrfeld |
| 4,968,001 A * | 11/1990 | Anderson et al. ........ 251/175 |
| 5,145,150 A | 9/1992 | Brooks |
| 5,263,685 A | 11/1993 | Winnike et al. |
| 5,338,003 A * | 8/1994 | Beson ................. 251/172 |
| 5,419,532 A | 5/1995 | Fan |
| 6,435,474 B1 | 8/2002 | Williams et al. |

* cited by examiner

Primary Examiner—Edward K. Look
Assistant Examiner—John K. Fristoe, Jr.
(74) Attorney, Agent, or Firm—Dunlap, Codding & Rogers, P.C.

(57) ABSTRACT

A seat assembly extending about an inlet passage of a valve and engaging a valve member is disclosed. The seat assembly includes an annular seat carrier having an annular groove formed therein, and a seat positioned in and extending from the annular groove of the seat carrier. The seat has an inner side, an outer side, and a plurality of spaced apart, concentric seal rings extending from the inner side of the seat to the outer side thereof. The seal ring nearest the inner side of the seat is engageable with the valve member to provide an innermost seal when the seat assembly is acted upon by a pressure within a pressure range and the seal ring nearest the inner side of the seat is deflectable in a radially outward direction and out of sealing engagement with the valve member when the pressure exceeds the pressure range to cause the adjacent seal ring to provide the innermost seal.

23 Claims, 6 Drawing Sheets

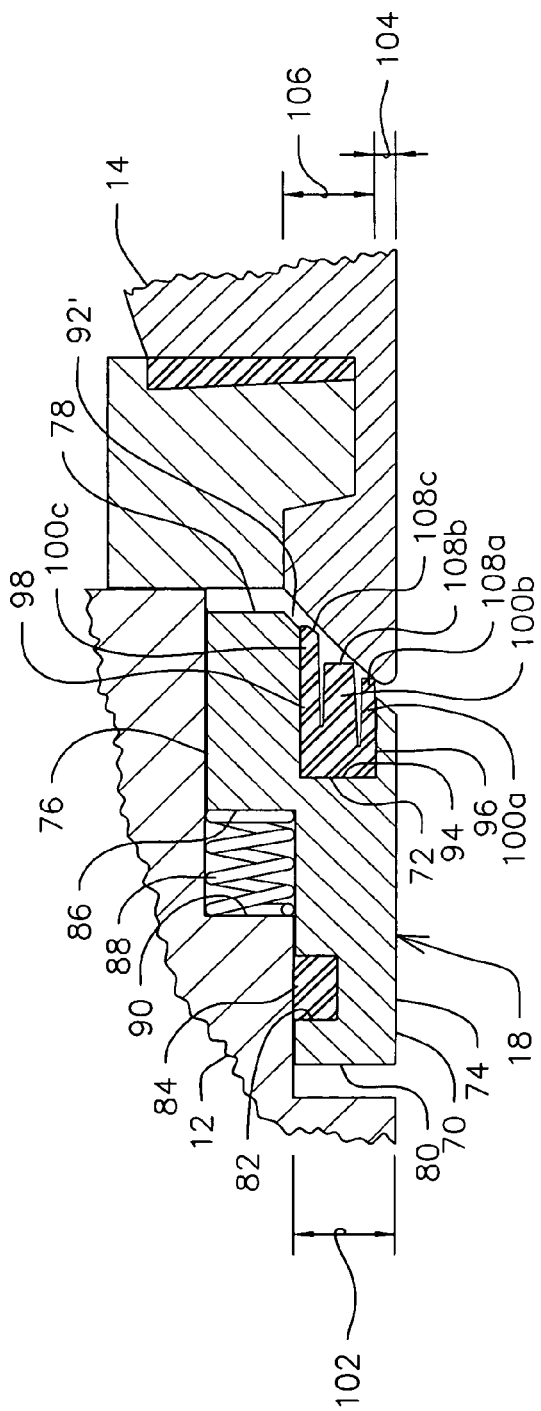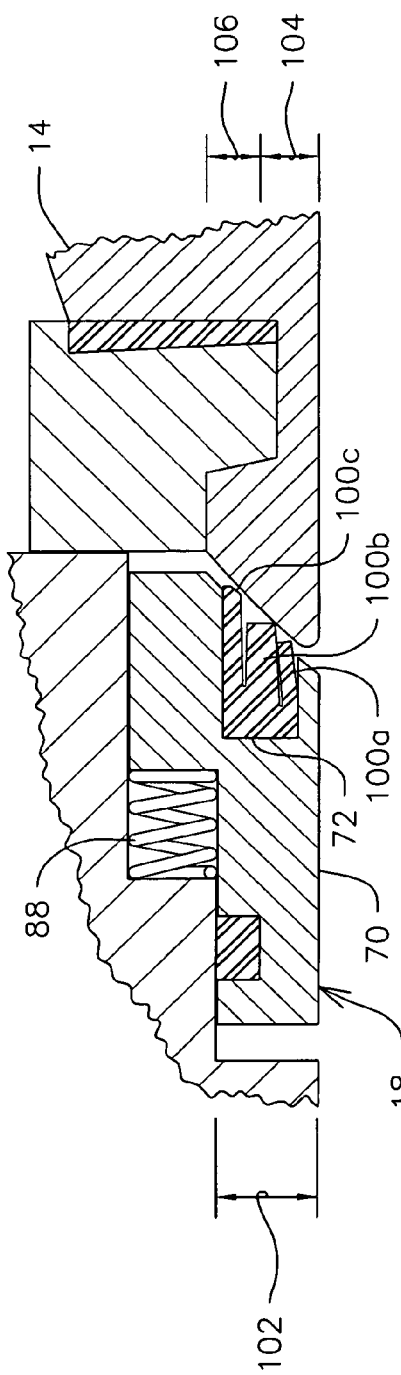

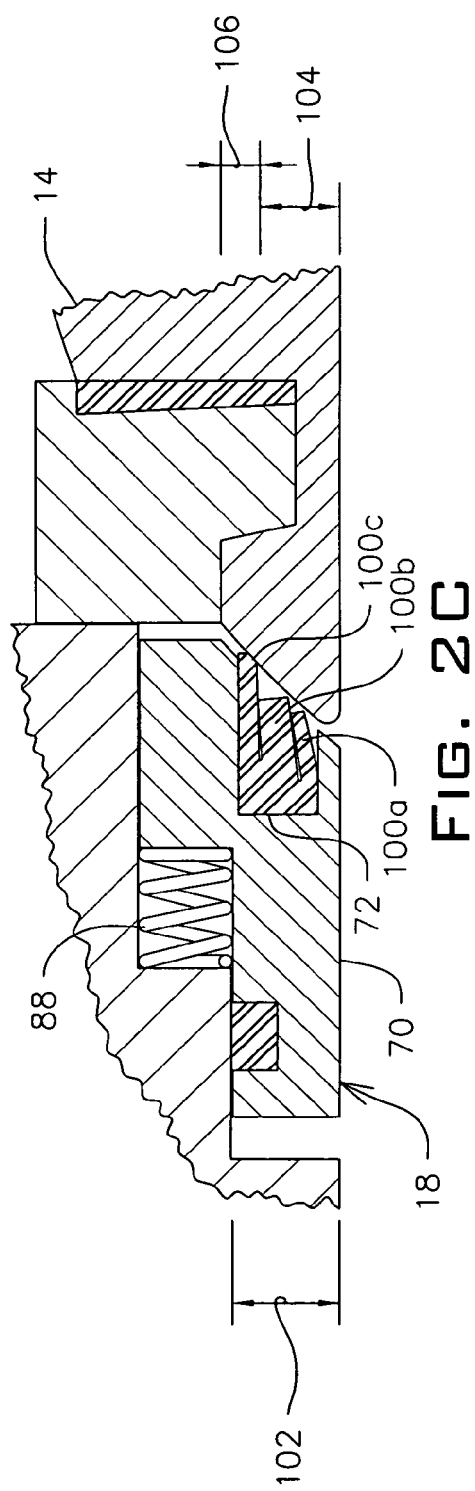
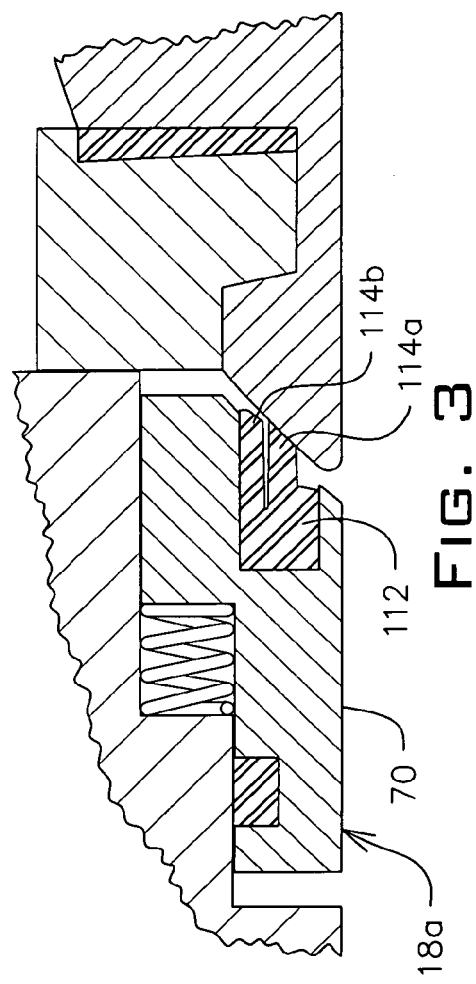

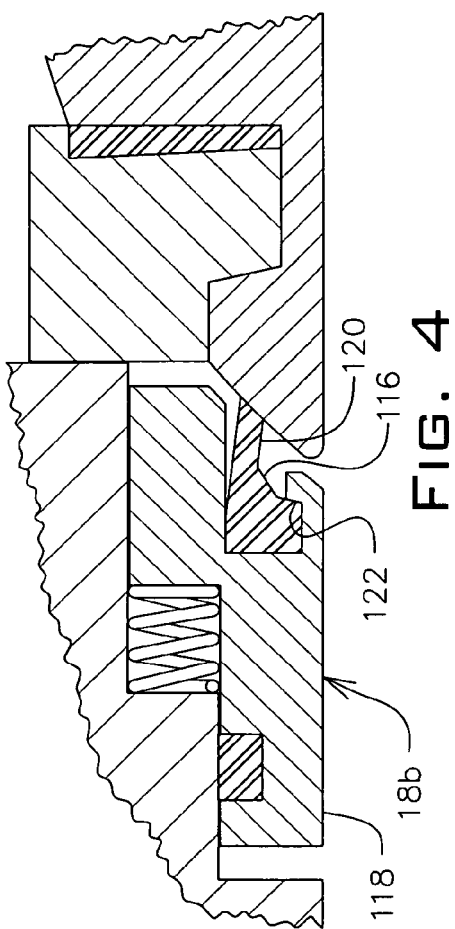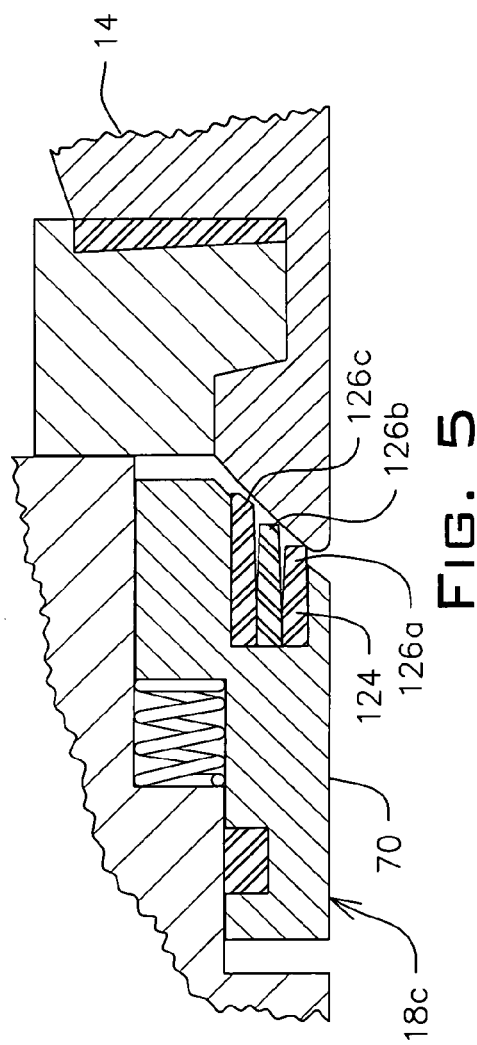

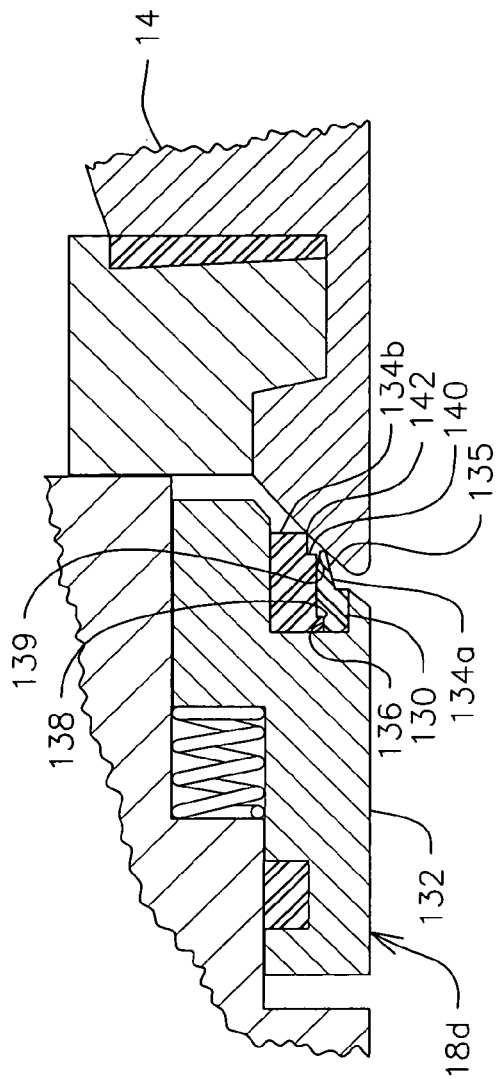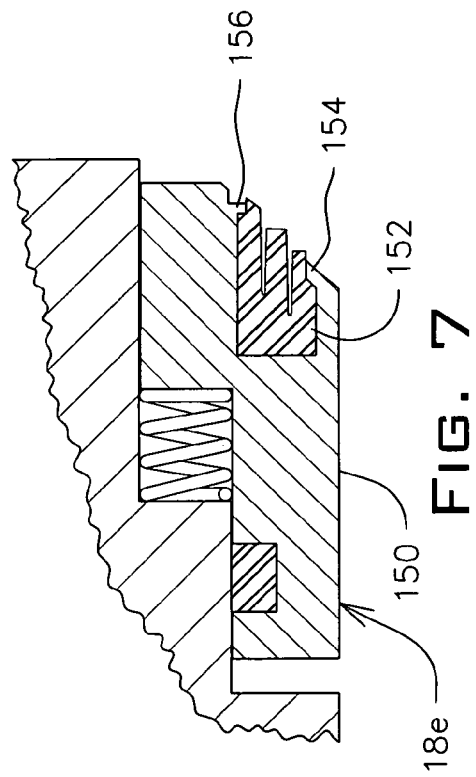

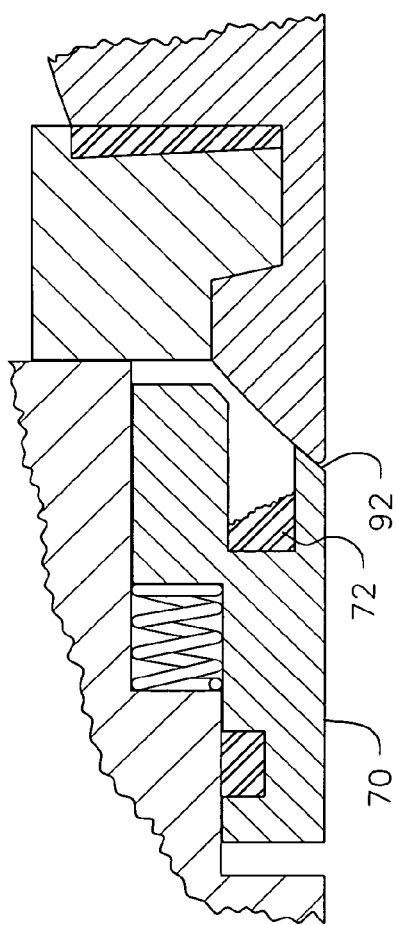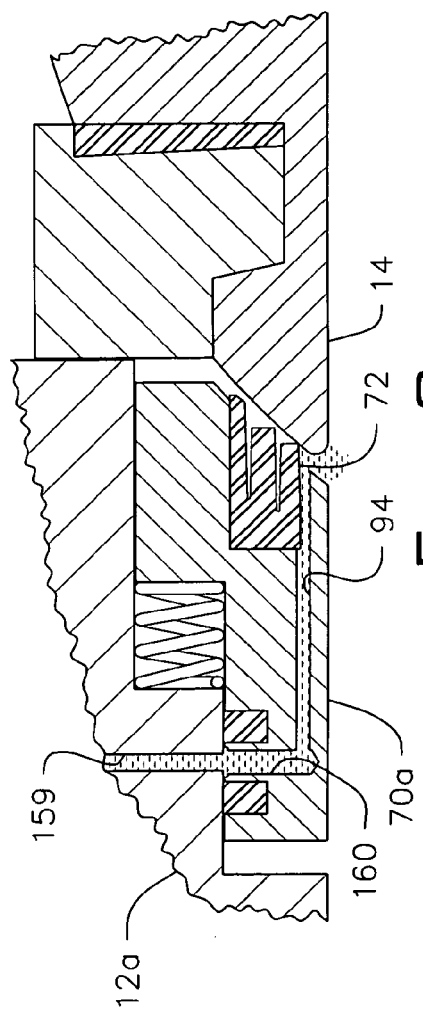

US 7,032,880 B2

VALVE WITH PRESSURE ADAPTABLE SEAT

BACKGROUND OF THE INVENTION

1. Field of the Invention

The present invention relates generally to seats for ball valves, and more particularly, but not by way of limitation, to an improved seat assembly for a trunnion mounted ball valve wherein the seat assembly is capable of adapting to varying working pressures.

2. Brief Description of Related Art

In the typical construction of a trunnion mounted ball valve, the ball is machined to provide "trunnions" that are mounted in bearings. The bearing-trunnion combination is intended to support the ball in a stationary position relative to the flow path, but allow rotation of the ball. The ball engages a pair of seat assemblies to form a seal around the ball.

The seat assemblies typically include an annular seat carrier and a ring-shaped seat positioned in a groove formed in the seat carrier. In a trunnion ball valve, the seat assemblies are free to move and respond to the internal line pressure because of differential surface area. That is, the surface area of the seat assembly being acted on by line pressure is greater on the end of the seat assembly positioned away from the ball valve than it is on the end engaging the ball. Consequently, the line pressure forces the seat assembly toward and against the ball valve. Both the upstream and downstream seat assemblies respond to line pressure in the same way, thus leading to the feature of a trunnion valve known as "double block and bleed."

Another feature of a trunnion ball valve is reduced operating torque at higher working pressures. Operating torque is primarily a function of the friction created by the seat contacting the ball at the sealing interface. The design considerations that affect the amount of friction generally are: (1) the axial force of the seat against the ball; (2) the contact area of the seat on the ball, combined with the hardness or compressive strength of the seat; and (3) the surface finish on the ball.

Traditional design efforts have been directed at minimizing the operating torque for opening and closing the valve at maximum working pressure. To achieve this desired result, it has generally been necessary to sacrifice low pressure sealability. As a result, trunnion mounted valves have notoriously poor performance when sealing at working pressures much less than maximum rated pressure. To produce the lowest torque at the most critical point (maximum rated working pressure), one would choose a seat with a thin seal surface to reduce contact area, a hard sealing material to reduce friction, and a small differential area to reduce the axial force. The low pressure sealability of such a design would be poor. To improve sealing at reduced pressures, one would need to change to a softer sealing material and then add springs to create a preload of axial force. In each case, the seal is not optimized except within a narrow range of pressures.

To this end, a need exists for an improved seat assembly that is capable of adapting to varying working pressures. It is to such an improved seat assembly that the present invention is directed.

BRIEF DESCRIPTION OF THE SEVERAL VIEWS OF THE DRAWINGS

FIG. 2A is an enlarged cross-sectional view of a portion of FIG. 1 illustrating a seat assembly constructed in accordance with the present invention and being acted upon by a low pressure FIG. 2B is an enlarged cross-sectional view of the seat assembly of FIG. 2A shown in an increased pressure condition.

FIG. 2C is an enlarged cross-sectional view of the seat assembly of FIG. 2A shown in a high pressure condition.

FIG. 3 is an enlarged cross-sectional view of another embodiment of a seat assembly constructed in accordance with the present invention.

FIG. 4 is an enlarged cross-sectional view of another embodiment of a seat assembly constructed in accordance with the present invention.

FIG. 5 is an enlarged cross-sectional view of another embodiment of a seat assembly constructed in accordance with the present invention.

FIG. 6 is an enlarged cross-sectional view of another embodiment of a seat assembly constructed in accordance with the present invention.

FIG. 7 is an enlarged cross-sectional view of another embodiment of a seat assembly constructed in accordance with the present invention.

FIG. 8 is an enlarged cross-sectional view of another embodiment of a seat assembly constructed in accordance with the present invention.

FIG. 9 is an enlarged cross-sectional view of another embodiment of a seat assembly constructed in accordance with the present invention.

DETAILED DESCRIPTION OF THE INVENTION

Figure 1:
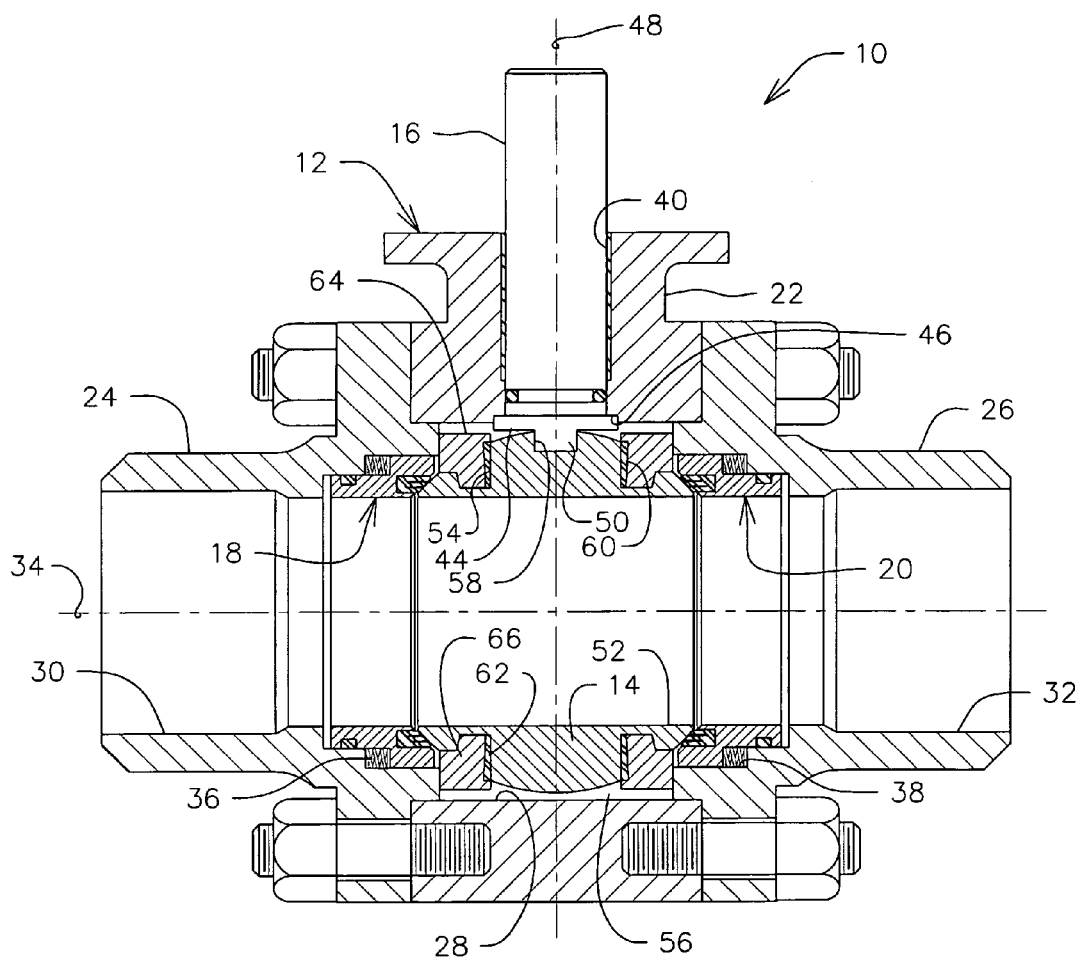
FIG. 1 is a vertical cross section of a trunnion valve constructed in accordance with the present invention.

Referring now to the drawings, and more particularly to FIG. 1, shown therein is a valve 10 constructed in accordance with the present invention. The valve 10 includes a body assembly 12, a valve member 14 disposed in the body assembly 12 for rotation between an open position (FIG. 1) and a closed position (not shown), and a stem 16 for rotating the valve 14 between the open position and closed position. The valve 10 further includes a pair of seat assemblies 18 and 20 for forming a seal between the body assembly 12 and the valve member 14.

The body assembly 12, as shown in FIG. 1, includes a body 22, a first end adaptor 24 connected to one end of the body 22, and a second end adapter 26 connected to the opposing end of the body 22. It will be appreciated by those of ordinary skill in the art that the body assembly 12 may be fabricated in two portions where one of the end adaptors 24 or 26 and the body 22 are integrally fabricated as one piece.

The body assembly 12 has a centrally disposed valve chamber 28, and an inlet passage 30 and an outlet passage 32 in communication with the valve chamber 28 to form a flow passageway through the body assembly 12 about a longitudinal flow axis 34. A first seat pocket 36 is formed about the inlet passage 30, and a second seat pocket 38 is formed about the outlet passage 32. The first seat pocket 36 is adapted to receive the seat assembly 18, and the second seat pocket 38 is adapted to receive the seat assembly 20.

The stem 16 extends through a stem bore 40 formed through the wall of the body 22. The stem 16 has a lower portion 44 with an enlarged diameter. The lower portion 44 is adapted to be received in a corresponding enlarged diameter portion 46 of the stem bore 40. The stem 16 is mounted within the stem bore 40 in a manner well known in the art for rotation about a trunnion axis 48. A key 50 is formed on the lower end of the stem 16. The key 50 extends diametrically across the end of the stem 16 and is adapted to matingly engage with the valve member 14.

The valve member 14 is mounted within the valve chamber 28 for rotation about the trunnion axis 48 between the opened position and the closed position wherein the valve member 14 is rotated substantially 90 degrees from the opened position to the closed position. The valve member 14 has a central bore 52 which aligns with the inlet passage 30 and the outlet passage 32 in the open position of the valve member 14 to permit the passage of fluid through the valve 10 when the valve member 14 is in the open position thereof. In the closed position of the valve member 14, the seat assemblies 18 and 20 engage the exterior surface of the valve member 14 and internal surfaces of the body assembly 12 to form fluid tight seals which disrupt fluid communication between the inlet passage 30 and the outlet passage 32.

The valve member 14 has the general form of a spherical ball with the central bore 52 formed therethrough extending circumaxially about a diameter thereof. Portions of the valve member 14 are cut away to form a circular first trunnion 54 and a circular second trunnion 56 which is diametrically opposed to the first trunnion 54 and coaxial therewith. A central slot 58 is formed in the distal end of the first trunnion 54 and is oriented along a line normal to the plane defined by the axis of the central bore 52 and the common axis of the first trunnion 54 and the second trunnion 56. The slot 58 is sized to receive the key 50 of the stem 16 so that the valve member 14 can be rotated about the trunnion axis 48 via rotation of the stem 16.

A first trunnion bushing or bearing 60 is mounted on the first trunnion 54, and a second trunnion bushing or bearing 62 is similarly mounted on the second trunnion 56. A first bearing retainer 64 is positioned about the first bearing 60 and extends longitudinally across the valve chamber 28 to engage opposing surfaces of the body assembly 12 so as to longitudinally support the first trunnion 54 of the valve member 14 within the valve chamber 28. Similarly, a second bearing retainer 66 is positioned about the second trunnion bearing 62 and extends across the valve chamber 28 to engage opposing surfaces of the body assembly 12 so as to longitudinally support the second trunnion 56 within the valve chamber 28.

In the preferred embodiments of the present invention, the seat assembly 20 is identical to the seat assembly 18 and is positioned in the second seat pocket 38 in the same manner that the seat assembly 18 is positioned in the first seat pocket 36. Accordingly, it is not believed necessary to describe the construction and positioning of both seat assemblies 18 and 20. Rather, it will suffice to describe the construction and positioning of the seat assembly 18 for the purposes of the present disclosure.

Referring now to FIG. 2A, an enlarged view of the seat assembly 18 is shown. The seat assembly 18 includes a seat carrier 70 and a seat 72. The seat carrier 70 is annularly shaped and formed of a metal, such as steel or stainless steel. The seat carrier 70 has an inner side 74, an outer side 76, an inward facing end 78, and an outward facing end 80. The outer side 76 is provided with an outer groove 82 dimensioned to receive a seal member 84. A portion of the outer side 76 of the seat carrier 70 also defines a shoulder 86 which permits a spring 88 to be positioned between the shoulder 86 and an opposing surface 90 of the body assembly 12 to bias the seat assembly 18 toward the valve member 14. The inner facing end 78 of the seat carrier 70 is provided with a frusto-conical surface 92 which has an annular grove 94 formed therein. It should be appreciated that references to "inner" and "outer" are made with respect to the longitudianal flow axis 34 (FIG. 1), and references to "inward facing" and "outward facing" are made with respect to the valve member 14.

The seat 72 is positioned in the annular groove 94 of the seat carrier 70 and extends therefrom so as to allow for sealing engagement with the valve member 14 in a manner to be discussed below. The seat 72 has an inner side 96, an outer side 98, and a plurality of spaced apart, concentric seal rings 100a–100c extending from the inner side 96 of the seat 72 to the outer side 98 thereof.

The seat assembly 18 moves along the longitudinal flow axis 34 (FIG. 1) in a piston like fashion in response to internal line pressure within the valve 10. The movement of the seat assembly 18 toward the valve member 14 is a result of the difference in surface areas between the outward facing end 80 of the seat carrier 70 and a combination of the inward facing end 78 of the seat carrier 70 and the seat 72 which are exposed to the line pressure. That is, as shown in FIG. 2A, the surface area of the outer facing end 80 of the seat carrier 70 (represented by line 102) that is exposed to the internal line pressure is greater than the combination of the surface area of the inward facing end 78 of the seat carrier 70 and the seat 72 (represented by line 104) that is exposed to the internal line pressure. The difference in the surface area, commonly referred to as "differential area" and represented by line 106, times the internal line pressure creates the axial force that pushes the seat assembly 18 against the valve member 14 to form the seal between the seat assembly 18 and the valve member 14.

As mentioned above, previous design efforts have been directed at minimizing the operating torque for opening and closing a trunnion valve being operated at maximum working pressure. To achieve this desired result, it has generally been necessary to sacrifice low pressure sealability. To produce the lowest torque at the most critical point (maximum rated working pressure), one would generally choose a seat formed with a thin seal surface to reduce contact area, a hard sealing material to reduce friction, and position the seat to provide a small differential area to reduce axial force. The low pressure sealability of such a design is poor. To improve sealing at reduced pressures, one would need to change to a softer sealing material and then add springs to create a preload of axial force to compensate for the reduction in axial force due to the lower line pressure while the differential area remains substantially unchanged. In contrast, the seal rings 100a–100c of the seat 72 of the present invention are adapted to provide low pressure sealability by providing a softer low pressure seal coupled with a differential area that results in increased axial force being applied to the low pressure seal, as well as high pressure sealability by providing a firmer high pressure seal coupled with a reduced differential area that mitigates the effects of an increase in axial force created by the higher line pressure.

Referring to FIGS. 2A–2C, the seal ring 100a provides a low pressure seal, the seal ring 100b an intermediate pressure seal, and the seal ring 100c a high pressure seal. To achieve the varying degrees of sealability, the seal rings 100a–100c are spaced from one another to permit radial deflection relative to one another. More particularly, the seal ring 100a, which is nearest the inner side 96 of the seat 72, is configured to provide an innermost seal when the seat assembly 18 is acted upon by a pressure within a first pressure range and to be deflected in a radially outward direction and out of sealing engagement with the valve member 14 when the pressure exceeds the first pressure range and cause the adjacent seal ring 100b to provide the innermost seal. Similarly, the seal ring 100b is configured to provide the innermost seal when the seat assembly 18 is acted upon by a pressure within a second pressure range, which is greater than the first pressure range, and to be deflected in a radially outward direction and out of sealing engagement with the valve member when the pressure exceeds the second pressure range and cause the adjacent seal ring 100c to provide the innermost seal.

By way of example, for a valve having a pressure rating of 1,500 psi, the first pressure range may extend from 0 psi to about 500 psi, the second pressure range from about 500 psi to about 1,000 psi, and the third pressure range being greater than about 1,000 psi. It will be appreciated, however, that the pressure ranges may be altered by changing the flexibility of the seal rings 100a–100c relative to one another.

The seat 72 is fabricated of an elastomeric material, such as polyethylene, polypropylene, nylon or acetal. To achieve the desired differences in deflection strength between the seal rings 100a–100c, the seal ring 100c is supported by the seat carrier 70 so that outward deflection of the seal ring 100c is prevented. Also, the seal ring 100b has a generally thicker configuration than the seal ring 100a. As such, the seal ring 100c is stiffer or more resistant to being deflected than the seal ring 100b, and the seal ring 100b is stiffer or more resistant to being deflected than the seal ring 100a. Each seal ring 100a–100c is also provided with a generally tapered configuration with a seal surface 108a–108c, respectively, at the distal ends thereof. The seat 72 is configured so that the seal surfaces 108a–108c of the seal rings 100a–100c are arranged to substantially conform to the contour of the valve member 14. The tapered configuration of the seal rings 100a and 100b, in particular, provide the seal rings 100a and 100b with a stable base to permit the seal rings 100a and 100b to provide a compression seal against the valve member 14, but then because of the spacing between the seal rings 100a–100c, the seal rings 100a and 100b are able to be deflected in a radially outward direction so that the seal surfaces 1008a and 108b move out of sealing engagement from the valve member 14 when the line pressure exceeds that which the seal rings 100a and 100b are capable of supporting. The seal rings 100a–100c are separated from one another by generally V-shaped notches 110a and 110b. Again, such a configuration provides each of the seal rings 100a–100c with a stable base portion, yet permits the seal surface 108a–108c to be deflected out of seating engagement with the valve member 14. However, the seal ring 100c is supported by the seat carrier 70 so that outward deflection of the seal ring 100c is prevented.

FIGS. 2A–2C illustrate the seat assembly 18 being acted upon by a low line pressure, an intermediate line pressure, and a high line pressure, respectively. With the low line pressure shown in FIG. 2A, the seal ring 100a is sealingly engaged with the valve member 14. With the seal ring 100a in sealing engagement with the valve member 14, the differential area 106 created by the difference in surface area 102 and surface area 104 has the affect of creating an axial force in the direction of the valve member 14 to provide an effective low pressure seal. As shown in FIGS. 2A–2C, employment of the spring 88 will supplement the axial force created due to the differential area 106, thereby ensuring an effective low pressure seal. However, if the differential area 106 is great enough when the seal ring 100a is in engagement with the valve member 14, it may be determined that the spring 88 is not required to create the desired seal, and thus may be omitted.

FIG. 2B illustrates the seal ring 100a having been deflected in a radially outwardly direction against the seal ring 100b and out of sealing engagement with the valve member 14 due to the lateral force acting on the seal ring 100a by a line pressure that exceeds that which the seal member 100a is able to withstand. As such, the seal ring 100b now forms the innermost seal and the surface area 104 is increased while the surface area 102 remains constant, thereby causing the differential area 106 to also decrease. Therefore, while the internal line pressure has increased and thus the axial force on the seat assembly 18 has in turn increased, the increase in axial force will be mitigated due to the decrease in differential area 106. This results in the creation of an effective seal when the seat assembly 18 is being acted upon by an intermediate pressure while still permitting the valve member 14 to be easily rotated between the open and closed positions.

FIG. 2C illustrates the seal rings 100a and 100b having been deflected in a radially outward direction against the seal ring 100c and out of sealing engagement with the valve member 14 due to the lateral force acting on the seal rings 100a and 100b by a line pressure that exceeds that which the seal members 100a and 100b are able to withstand. As such, the seal ring 100c now provides the innermost seal. Consequently, the surface area 106 which is exposed to the internal line pressure increases while the surface area 102 has remains constant. The result is the differential area 106 further decreases thus mitigating the increase in axial force created by the higher line pressure.

FIG. 3 illustrates another embodiment of a seat assembly 18a that includes a seat 112 positioned in the seat carrier 70. The seat 112 has two seal rings 114a and 114b, as opposed to the three seal rings 100a–100c of the seat 70 shown in FIGS. 2A–2C. The seal rings 114a and 114b are substantially similar in construction and function to the seal rings 100b and 100c, respectively, of the seat assembly 18.

FIG. 4 shows yet another embodiment of a seat assembly 18b that includes a seat 116 positioned in a seat carrier 118. The seat 116 is provided with a single seal ring 120. The seal ring 120 is formed to be inwardly biased so that the distal portion of the seal ring 120 is spaced from the seat carrier 118. At lower pressures, the seal ring 120 provides an effective seal because the differential area is increased, and thus the axial force is increased, due to the inward bias of the seal ring 120. However, as the line pressure increases, the seal ring 120 will be deflected outwardly into engagement with the seat carrier 118 which prevents additional deflection of the seal ring 120 and permits the seal ring 120 to provide an effective high pressure seal while also causing the differential area to be reduced to mitigate the effects of the increased axial force applied to the seat assembly 18b.

The seat carrier 118 is similar in construction to the seat carrier 70 described above with the exception that the seat carrier 118 is provided with a lip 122 which serves to secure the seat 116 in the seat carrier 118.

FIG. 5 illustrates another embodiment of a seat assembly 18c that includes a seat 124 positioned in the seat carrier 70. The seat 124 includes three seal rings 126a–126c. The seal ring 126a is intended to provide a low pressure seal, the seal ring 126b an intermediate pressure seal, and the seal ring 126c a high pressure seal. The distal portions of the seal rings 126a–126c are spaced from one another to permit radial deflection relative to one another. However, to achieve the desired differences in deflection strength between the seal rings 126a–126c, the seal ring 126c is fabricated of a harder material than the seal ring 126b, which in turn is fabricated of a harder material than the seal ring 126a. As such, the seal ring 126c is stiffer or more resistant to being deflected than the seal ring 126b, and the seal ring 126b is stiffer or more resistant to being deflected than the seal ring 126a. Like the seal rings 100a–100c described above, each seal ring 126a–126c is also provided with a generally tapered configuration with a seal surface at the distal ends thereof. The seat 124 is configured so that the seal surfaces are arranged to substantially conform to the contour of the valve member 14.

By way of example, the seal ring 126a may be fabricated of a material commonly used for low pressure seal rings, such as fluorocarbon. The seal ring 126b may be fabricated of a harder material, such as nylon. Finally, the seal ring 126c may be fabricated of an even harder material commonly used for high pressure seal rings, such as acetal.

FIG. 6 shows another embodiment of a seat assembly 18d that includes a seat 130 positioned in a seat carrier 132. The seat 130 has two seal rings 134a and 134b, each formed of a different type of material. The seal ring 134a is intended to provide a low pressure seal and the seal ring 134b a high pressure seal. A distal portion 135 of the seal ring 134a is tapered to create a space between the seal ring 134a and the seal ring 134b to permit radial deflection of the seal ring 134a relative to the seal ring 134b. A proximal portion of the seal ring 134a is provided with an annular groove 136.

The seal ring 134b is provided with a ridge 138 sized and shaped to mate with the groove 136 of the seal ring 134a and interlock the seal ring 134a with the seal ring 134b. The seal ring 134b has an inner surface 139 positioned to support the distal portion 135 of the seal ring 134a when the seal ring 134a is in a outwardly deflected condition. The seal ring 134b is further provided with a notch 140 that creates a space between the inner surface 138 and a seal surface 142. The space allows for a change in differential area upon the seal ring 134a being deflected out of sealing engagement with the valve member 14. It will be appreciated that the shape of the seal rings 134a and 134b may be changed to effect the extent to which the differential area will change between when the seal ring 134a is in sealing engagement with the valve member 14 and when the seal ring 134a is deflected out of sealing engagement with the valve member.

Like the seat assembly 18c, the seal rings 134a and 134b of the seat assembly 18d may be fabricated of a variety of different materials. By way of example, the seal ring 134a may be fabricated of a material commonly used for low pressure seal rings, such as nylon, while the seal ring 134b may be fabricated of a harder material, such as acetal.

FIG. 7 illustrates another embodiment of a seat assembly 18e that includes a seat carrier 150 and a seat 152. The seat assembly 18e is similar to the seat assembly 18 of FIGS. 2A–2C with the exception that the seat carrier 150 is provided with an inner lip 154 and an outer lip 156 to which the seat 152 conforms to help secure the seat 152 in the seat carrier 150. It should be appreciated that only one of the inner and outer lips 154 and 156 may be necessary to hold the seat 152 in the seat carrier 150.

FIG. 8 illustrates the seat carrier 70 described in detail above providing a secondary metal seat along the frustoconical surface 92 if the seat 72 should be destroyed by fire or be damaged otherwise.

FIG. 9 illustrates a modified seat carrier 70a positioned in a modified body assembly 12a. The body assembly 12a has a sealant injection port 159, and the seat carrier 70a has been provided with a sealant injection port 160 aligned with the sealant injection port 159 of the body assembly 12a for injecting a sealant between the seat carrier 70a and the valve member 14. The sealant injection port 160 intersects the annular groove 94 of seat carrier 70a so that sealant is injected on the inner side of the seat 72.

Changes may be made in the combinations, operations and arrangements of the various parts and elements described herein without departing from the spirit and scope of the invention as defined in the following claims.

What is claimed:

1. A valve, comprising:
    a valve body having a valve chamber and an inlet passage and an outlet passage in communication with the valve chamber;
    a valve member positioned in the valve chamber and movable between an open position and a closed position, the valve member having a flow passage formed therethrough for providing fluid communication between the inlet passage and the outlet passage of the valve body when the valve member is in the open position; and
    a seat assembly extending about the inlet passage and engaging the valve member, the seat assembly comprising:
        an annular seat carrier having an annular groove formed therein; and
        a seat positioned in and extending from the annular groove of the seat carrier, the seat having an inner side, an outer side, and a plurality of spaced apart, concentric seal rings extending from the inner side of the seat to the outer side thereof, the seal ring nearest the inner side of the seat being engageable with the valve member to provide an innermost seal when the seat assembly is acted upon by a pressure within a pressure range and the seal ring nearest the inner side of the seat being deflectable in a radially outward direction and out of sealing engagement with the valve member when the pressure exceeds the pressure range to cause the adjacent seal ring to provide the innermost seal.

2. The valve of claim 1 wherein each successive seal ring from the inner side of the seat to the outer side thereof is stiffer than the preceding seal ring.

3. The valve of claim 2 wherein each of the seal rings has a width and wherein the width of each seal ring is different from the width of the other seal rings.

4. The valve of claim 2 wherein each of the seal rings is made of a different material.

5. The valve of claim 1 wherein the outermost seal ring is supported by the seat carrier such that outward deflection of the outermost seal ring is prevented.

6. The valve of claim 1 wherein the seat carrier is made of metal and wherein at least a portion of the seat carrier is sealing engageable with valve member in the event of destruction of the seal rings.

7. The valve of claim 1 wherein each of the seal rings is separated from the adjacent seal ring by a substantially V-shaped notch.

8. The valve of claim 1 wherein at least the innermost seal ring is resilient.

9. A seat assembly for a valve, comprising:
    an annular seat carrier having an annular groove formed therein; and
    a seat positioned in and extending from the annular groove of the seat carrier, the seat having an inner side, an outer side, and a plurality of spaced apart, concentric seal rings extending from the inner side of the seat to the outer side thereof, the seal ring nearest the inner side of the seat being engageable with a valve member to provide an innermost seal when the seat assembly is acted upon by a pressure within a pressure range and the seal ring nearest the inner side of the seat being deflectable in a radially outward direction and out of sealing engagement with the valve member when the pressure exceeds the pressure range to cause the adjacent seal ring to provide the innermost seal.

10. The seat assembly of claim 9 wherein each successive seal ring from the inner side of the seat to the outer side thereof is stiffer than the preceding seal ring.

11. The seat assembly of claim 10 wherein each of the seal rings has a width and wherein the width of each seal ring is different from the width of the other seal rings.

12. The seat assembly of claim 10 wherein each of the seal rings is made of a different material.

13. The seat assembly of claim 9 wherein the outermost seal ring is supported by the seat carrier such that outward deflection of the outermost seal ring is prevented.

14. The seat assembly of claim 9 wherein the seat carrier is made of metal and wherein at least a portion of the seat carrier is sealingly engageable with the valve member in the event of destruction of the seal rings.

15. The seat assembly of claim 9 wherein each of the seal rings is separated from the adjacent seal ring by a substantially V-shaped notch.

16. The seat assembly of claim 9 wherein at least the innermost seal ring is resilient.

17. A seat for a valve, comprising:
a plurality of spaced apart, concentric seal rings, the seal ring nearest an inner side of the seat being engageable with a valve member to provide an innermost seal when the seat is acted upon by a pressure within a pressure range and the seal ring nearest the inner side of the seat being deflectable in a radially outward direction and out of sealing engagement with the valve member when the pressure exceeds the pressure range to cause the adjacent seal ring to provide the innermost seal, wherein each of the seal rings is separated from the adjacent sealring by a substantially V-shaped notch.

18. The seat of claim 17 wherein each successive seal ring from the inner side of the seat to an outer side thereof is stiffer than the preceding seal ring.

19. The seat of claim 18 wherein each of the seal rings has a width and wherein the width of each seal ring is different from the width of the other seal rings.

20. The seat of claim 18 wherein each of the seal rings is made of a different material.

21. The seat of claim 17 wherein at least the innermost seal ring is resilient.

22. A valve, comprising:
a valve body having a valve chamber and an inlet passage and an outlet passage in communication with the valve chamber;

a valve member positioned in the valve chamber and movable between an open position and a closed position, the valve member having a flow passage formed therethrough for providing fluid communication between the inlet passage and the outlet passage of the valve body when the valve member is in the open position; and a seat assembly extending about the inlet passage and engaging the valve member, the seat assembly comprising:
an annular seat carrier having an annular groove formed therein; and a seat positioned in and extending from the annular groove of the seat carrier, the seat having an inner side, an outer side, and a seal ring having a distal portion is formed to be biased toward the inner side of the seat so that the distal portion is spaced from the seat carrier, the seal ring being engageable with the valve member to provide a seal when the seat assembly is acted upon by a pressure and the seal ring being deflectable in a radially outward direction resulting in a decrease in differential area thereby mitigating the effects of increased axial force applied to the seat assembly as the pressure increases, wherein the distal portion is engageable with a distal portion of the seat carried to limit outward deflection of the seal ring.

23. The valve of claim 22 wherein the seat carrier is made of metal and wherein at least a portion of the seat carrier is sealingly engageable with the valve member in the event of destruction of the seal ring.

* * * * *